US012769529B2

(12) United States Patent
Verma et al.

(10) Patent No.: US 12,769,529 B2
(45) Date of Patent: Oct. 20, 2026

(54) DEPLOYMENT POLICY FOR SOFTWARE UPDATES ACROSS CLOUD ENVIRONMENTS DRIVEN BY ARTIFICIAL INTELLIGENCE

(71) Applicant: Microsoft Technology Licensing, LLC, Redmond, WA (US)

(72) Inventors: Nidhi Verma, Bellevue, WA (US); Chandra Sekhar Inguva, Salt Lake City, WA (US); Michael John Neuburger, Snoqualmie, WA (US); Amy Leigh Josefczyk, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 18/734,604

(22) Filed: Jun. 5, 2024

(65) Prior Publication Data

US 2025/0377876 A1 Dec. 11, 2025

(51) Int. Cl.
*G06F 8/60* (2018.01)
*G06F 8/71* (2018.01)

(52) U.S. Cl.
CPC . *G06F 8/60* (2013.01); *G06F 8/71* (2013.01)

(58) Field of Classification Search
None
See application file for complete search history.

(56) References Cited

U.S. PATENT DOCUMENTS 11,372,634 B1 * 6/2022 Gabrielson ............. H04L 67/55
12,625,698 B1 * 5/2026 Hirani ........................ G06F 8/65
2019/0156246 A1 * 5/2019 Kuo .......................... G06N 5/04
2021/0365255 A1 * 11/2021 Verma ........................ G06F 8/60
2021/0368045 A1 * 11/2021 Verma ................. G06F 11/3409
2023/0168880 A1 * 6/2023 Verma ................. G06F 11/3612 717/172
2023/0221941 A1 * 7/2023 Kholodkov ............... G06F 8/65 717/168

(Continued)

OTHER PUBLICATIONS

Grubic et al., "Conveyor: One-Tool-Fits-All Continuous Software Deployment at Meta," Usenix, 2023. (Year: 2023).*

*Primary Examiner* — Ryan D. Coyer

(74) *Attorney, Agent, or Firm* — Han Gim; Newport IP, LLC

(57) ABSTRACT

A data processing system includes a processor and a memory for the processor. The memory stores executable instructions that, when executed by the processor alone or in combination with other processors, cause the data processing system to perform functions of: receive a deployment request to deploy a software change; determine factors corresponding to the deployment request that impact an optimal deployment policy for the software change; query an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time; execute the deployment request using the optimized deployment policy returned by the AI; and update training of the AI based on the determined factors and results of the optimized deployment policy.

20 Claims, 11 Drawing Sheets

(56) References Cited

U.S. PATENT DOCUMENTS

| | | | | |
|---|---|---|---|---|
| 2023/0385101 | A1* | 11/2023 | Verma | G06F 9/4881 |
| 2024/0069886 | A1* | 2/2024 | Verma | G06F 8/65 |
| 2024/0143303 | A1* | 5/2024 | Kholodkov | G06F 16/27 |
| 2024/0338196 | A1* | 10/2024 | Kholodkov | H04L 41/082 |
| 2024/0414044 | A1* | 12/2024 | Verma | G06F 11/2294 |

* cited by examiner

DEPLOYMENT POLICY FOR SOFTWARE UPDATES ACROSS CLOUD ENVIRONMENTS DRIVEN BY ARTIFICIAL INTELLIGENCE

BACKGROUND

Software deployment is the process of making a software system available for use. It involves various activities, such as building, testing, packaging, releasing, installing, configuring, and updating the software. Software developers utilize iterative processes, referred to as DevOps, to deploy software to users. As part of the DevOps process, developers regularly merge their code changes to repositories. Software builds are then created which can be tested, released and deployed to user environments. These software deployments include build and release artifacts which include details of deployment activity, build information, pull requests (PRs), testing and developer information.

During the deployment process of software changes, the developers test the changes and then deploy them to internal environments. The software is then operated in the internal environment to ensure the changes are successful and there is no impact to the software reliability and availability metrics before the changes are deployed to the user or production environment. In teams with more mature DevOps practices, ring-based deployment is used to deploy software changes across environments. In this approach software changes are deployed to a small set of users who can accept more risk, such as internal personnel, before being deployed to external parts of the userbase. As deployment is successfully rolled out without impact to system availability and reliability, it is rolled out to larger and larger parts of the userbase until all users have the updated version of the software.

For the deployment overall and for each ring, developers decide rollout policies, bake time and deployment time to ensure the service can be evaluated for software change success. Rollout policies define the strategy and rules for deploying new software changes across different user groups or environments. These policies ensure that the deployment is carried out in a phased, controlled manner to minimize risk and impact. Bake times refer to the period during which a new software change is left running in a particular deployment ring before it is promoted to the next ring. The purpose of bake times is to ensure that the changes are stable and do not introduce unforeseen issues. Deployment times are the specific windows or time periods during which the actual rollout process occurs. These times are chosen to minimize disruption and maximize efficiency.

However, developers can readily make non-optimal choices in deciding rollout policies, bake times and deployment times. There are many different variables and user considerations involved as to what would be an optimal deployment policy for updated software.

SUMMARY

In one general aspect, the present description presents a data processing system that includes a processor and a memory for the processor. The memory stores executable instructions that, when executed by the processor alone or in combination with other processors, cause the data processing system to perform functions of: receive a deployment request to deploy a software change; determine factors corresponding to the deployment request that impact an optimal deployment policy for the software change; query an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time; execute the deployment request using the optimized deployment policy returned by the AI; and update training of the AI based on the determined factors and results of the optimized deployment policy.

In another general aspect, the present description presents a data processing system that includes a processor and a memory in communication with the processor, the memory comprising executable instructions that, when executed by the processor alone or in combination with other processors, cause the data processing system to implement: a software release pipeline to receive a deployment request to deploy a software change; a deployment risk model to determine factors corresponding to the deployment request that impact an optimal deployment policy for the software change; a deployment rollout recommender to query an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time; and a deployment engine to execute the deployment request using the optimized deployment policy returned by the AI.

In another general aspect, the present description presents a method of determining an optimal deployment policy for a software change to a cloud service, the method including: receiving a deployment request to deploy a software change; determining factors corresponding to the deployment request that impact an optimal deployment policy for the software change; prompting an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time; executing the deployment request using the optimized deployment policy returned by the AI; and updating training of the AI based on the determined factors and results of the optimized deployment policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, developers can readily make non-optimal choices in deciding rollout policies, bake times and deployment times. There are many different variables and user perspectives involved as to what would be an optimal deployment policy for updated software. Optimal deployment policies, including rollout policies, bake time and deployment time, should take into account the needs of the userbase including specific segments of the userbase. For example, optimal deployment policies should account for: user risk events (could be industry specific, user specific, and geography specific); user peak usage times; software change risk; software rollout history; software outage and incidents history; and service compliance assessment history.

Consequently, the following description proposes a smart deployment system which considers the software change risk holistically including from the perspectives of tenant needs. This system utilizes artificial intelligence (AI) to recommend a customized optimal ring policy, ring bake time and deployment time. Once the recommended deployment policy has been executed, feedback from the software changes across rings is incorporated to further train the AI and refine a recommendation for the next software change. Using this approach, the system continually learns from the changes to software, tenant usage, and incident and outage history to determine the optimal rollout strategy for a software change.

Figure 1A:
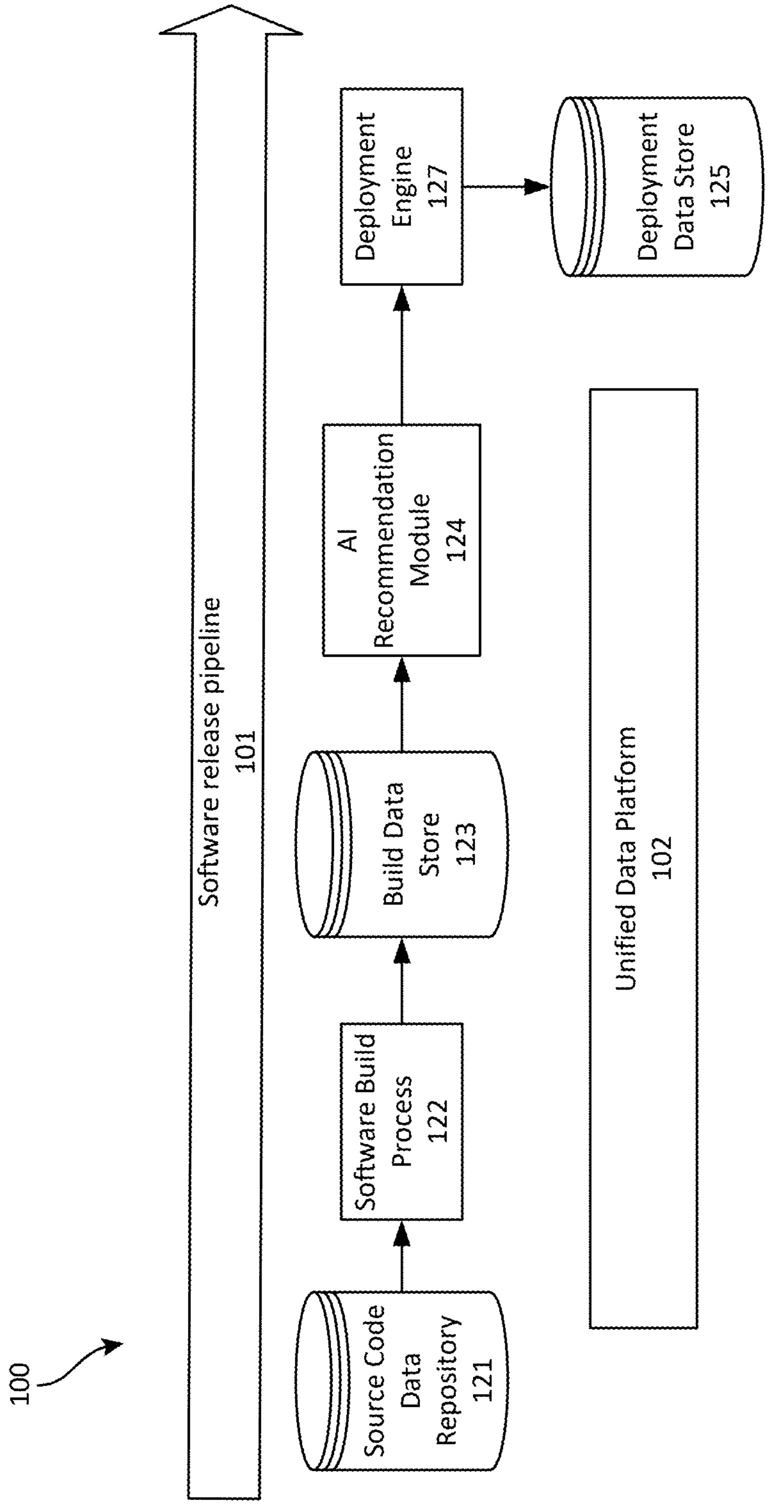
FIG. 1A depicts an example system according to the AI-driven technique described herein for optimizing a software change rollout strategy.

FIG. 1A depicts an example system according to the AI-driven technique described herein for optimizing a software change rollout strategy. As shown in FIG. 1A, the system 100 includes a software release pipeline 101. The software release pipeline 101 includes a source code data repository 121, a software build process 122, a build data store 123, and AI recommendation module 124 and a deployment engine 127. The deployment engine 127 deploys the software updates to various rings of the userbase based on a deployment policy generated by the AI recommendation module 124 and records telemetry in a deployment data store 125.

A unified data platform 102 collects deployment, build artifacts and process telemetry from the pipeline 101, as will be described in further detail below. The unified data platform 102 cleans, normalizes and transforms the data into a structured format. More specifically, the unified data platform 102 is responsible for collecting deployment data from various sources such as version control systems, release management, artifact retention, build system and other data sources. The unified data platform 102 uses different methods to access data sources, such as Application Programming Interfaces (APIs), Software Development Kits (SDKs), and database queries. The unified data platform 102 has additional capabilities to aggregate and merge the data from different sources based on certain criteria and includes elements that perform data pre-processing steps. The unified data platform 102 also has quality monitoring and remediation systems to ensure high quality data is available for the users.

Figure 1B:
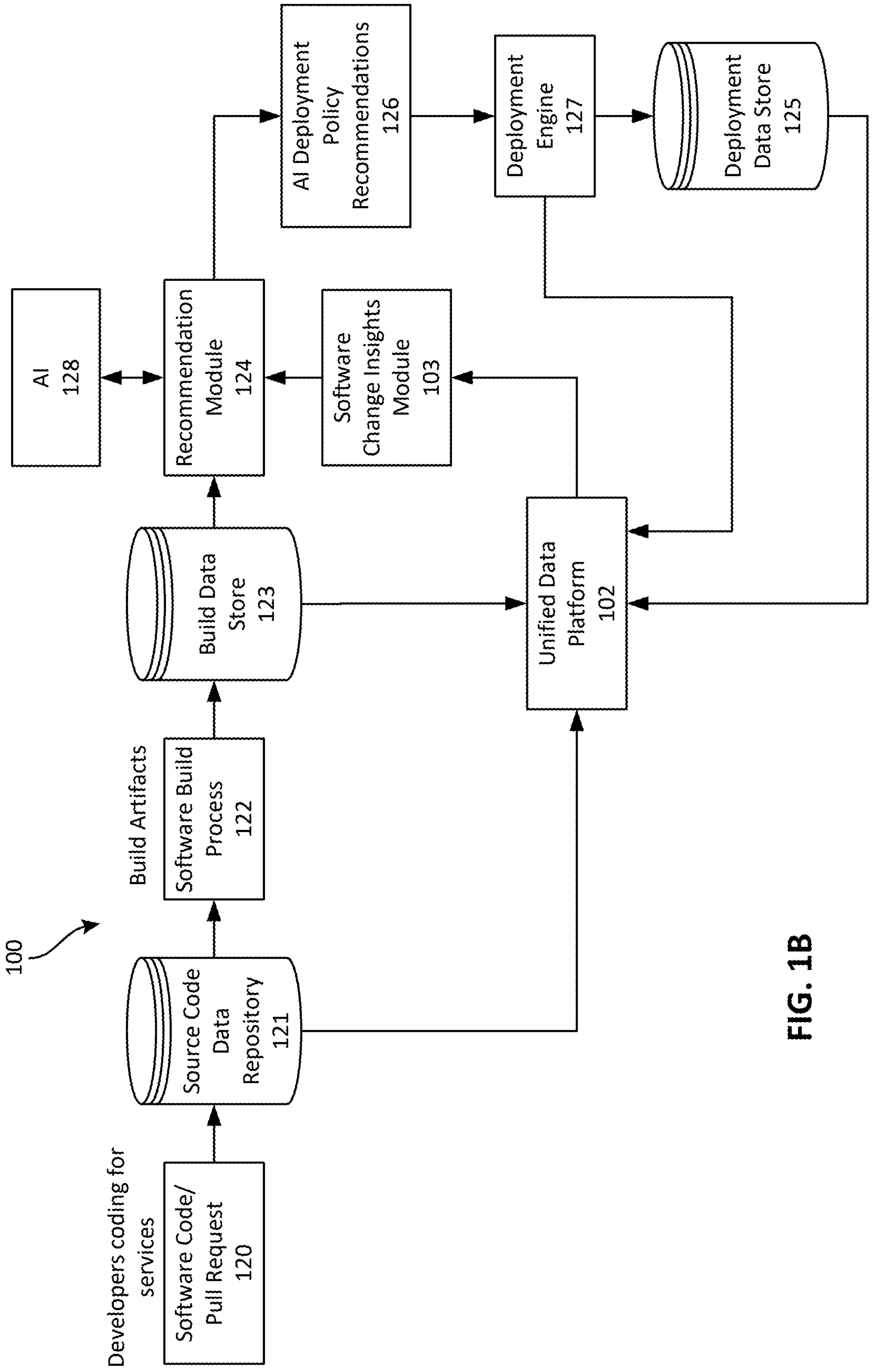
FIG. 1B depicts additional detail of the example system illustrated in FIG. 1A.

FIG. 1B depicts additional detail of the example system illustrated in FIG. 1A. As shown in FIG. 1B and as noted above, the software release pipeline 101 is operated based on software code pull requests (PR) 120 entered by developers that are coding upgrades for the application or service. As developers generate new or upgraded code for the application or service, that new code is stored in a source code data repository 121. To implement the upgrade of the new code, the developer submits a PR 120 to the software release pipeline including the source code data repository 121.

This results in the software build process 122 compiling the code specified in the PR. More specifically, the build process 122 executes on source code of the PR and its dependencies to compile, link, and package the code into a runnable state. This process might include compiling source code into binary code, executing automated tests, performing code analysis, and preparing the software for deployment. The build process is a critical step in software development, ensuring that the software is correctly assembled from its source components and is ready for execution. The term "build" can also refer to the specific instance or version of the software that is being compiled. A build may include components in different programming languages.

A "build artifact" is the output or the result of the build process. These artifacts are the deployable components of the software that are generated once the build process is completed. Artifacts can include binary files, libraries, executables, war files, jar files, documentation, configuration files, and any other files needed for the software to run and be deployed. Essentially, build artifacts are the packaged version of the software that can be deployed to a server or delivered to an end user. These build artifacts are stored in a build data store 123 of the software release pipeline.

Once the build artifacts are prepared, the recommendation module 124 will generate a recommended deployment policy. Specifically, the recommendation module 124 will assemble relevant information about the software change to be implemented, as will be described in more detail below, and will submit this information to an artificial intelligence (AI) 124. The AI 128 may be a Machine Learning Model (MLM) that has been trained to optimize a deployment policy based on a variety of factors that take into account, among other things, the needs and risks of different tenant groups in the userbase. Specifically, a training dataset is assembled that includes a large volume of software update scenarios based on various factors to be considered paired with matching optimized deployment policies. The factors to be considered include, for example, user risk events (could be industry specific, user specific, and geography specific); user peak usage times; software change risk; software rollout history; software outage and incidents history; and service compliance assessment history. The larger the training dataset, the better the recommended deployment policies from the AI 128 are likely to be. As noted, the system uses telemetry from deployment policies output by the AI 128 and implemented to augment the training of the AI 128.

Referring still to FIG. 1B, the AI deployment policy recommendation 126 from the AI is received by the recommendation module 124 and input to a deployment engine 127. The deployment engine 127 will implement the deployment policy by deploying the software update using the corresponding build artifact to all the rings of the cloud environment according to a ring policy, ring bake time and deployment time of the recommended deployment policy 126. The deployment engine 127 will also store telemetry from the deployment in the deployment data store 125. For example, the deployment data store 125 records deployment data or telemetry including incident reporting and saturation, which refers to what percentage of the total user environment has received deployment of the current upgrade.

As also shown in FIG. 1B, the unified data platform 102 collects data from various points in the software release pipeline. The unified data platform 102 has access to the source code repository 121, the build data store 123, the deployment engine 127 and the deployment data store.

The unified data platform 102 communicates with a software change insights module 103. One purpose of the insights module 103 is to document deployments made by the deployment engine 127 to augment the training dataset of the AI 128. Thus, the software change insights module 103 identifies the artifacts related to a particular build and extracts the code changes which are part of that build. Using this as input, the insights module 103 can utilize a LLM that is trained on programming code to generate a code summary for each PR and an aggregated summary of the changes in the corresponding build. After this step, the insights module 103 can categorize the build into one or more categories (e.g., client, package, bug, version upgrade, security, component upgrade etc.) and categorize whether the build includes only pull requests approved by developers, automated systems or both. The system also provides insights on build-related failures and false positive successes for software testing.

Figure 1C:
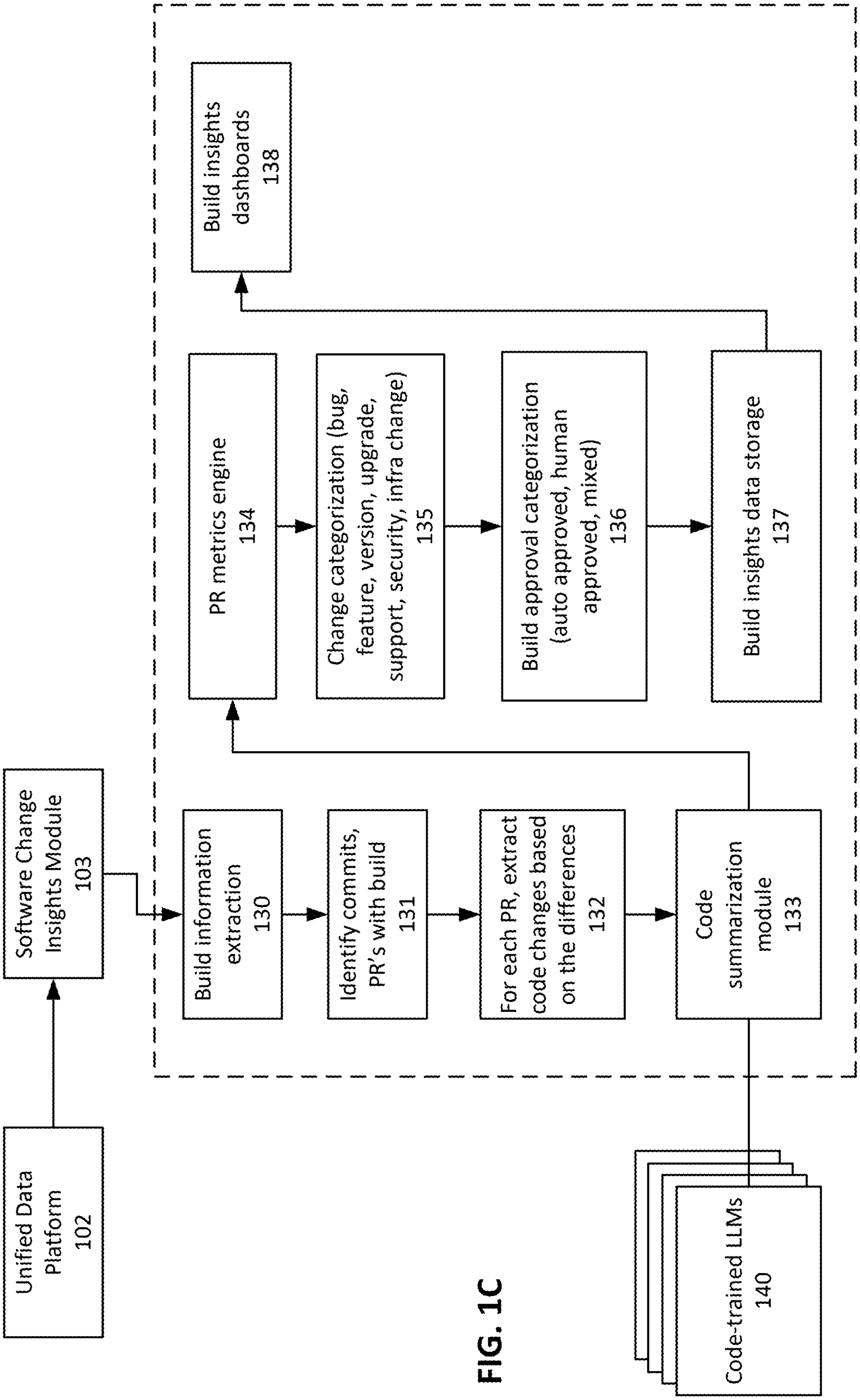
FIG. 1C depicts additional details of the Software Change Insights Module illustrated in FIG. 1B.

FIG. 1C illustrates an example operation of the software change insight module from FIG. 1B. As shown in FIG. 1C, the data collected by the unified data platform 102 from the software release pipeline is available to the software change insights module 103. In operation, the software change insights module 103 will first extract information for each build, i.e., build information extraction 130. Specifically, the software change insights module 103 will identify the pull requests and commits associated with each build 131. Also, for each pull request, the software change insights module 103 will extract what code changes are being made by the build by differencing the previous and updated code 132.

Given the volume of a build, what is actually happening in a particular build may be difficult for an engineer to understand. This difficulty is multiplied when there are a number, perhaps hundreds, of builds being implemented within a relatively short amount of time. To solve this technical problem, a code summarization module 133 will receive the information determined for each build in 130-132 and generate a summary of what is happening. This summary can be generated using code-trained LLMs to produce a summary that is readily intelligible to an engineer and provides an accurate picture of the code changes being implemented by the software release pipeline.

The accumulated data and generated code change summary are input to a pull request metrics engine 134. The pull request metrics engine 134 will associate a change categorization with each build in the summary. For example, the changes may be categorized as bug fixes, implementing new features, a version change, an upgrade, a support change, a security update or infra change 135. The pull request metrics engine 134 may also categorize a build by size, for example, small, medium or large.

Based on the accumulated data, the pull request metrics engine 134 will also indicate for each build how the build was approved. For example, in this build approval categorization 136, the build approval may be indicated as auto approved, developer approved or mixed approval. This information is stored in a build insights data storage 137. Additionally, this information can be displayed for an engineer in a set of build insights dashboards 138. The data of the build insights data storage 137 is also available to the AI recommendation module 124 for use in prompting the AI 128, as described above.

As mentioned above, the code summarization module 133 will use one or more LLMs 140 to generate a summary of a build or number of builds that allows an administrator to understand what the builds are doing or are supposed to be doing in upgrading the application or service. In common experience, an LLM is a type of AI that specializes in processing, understanding, generating, and sometimes translating human language. Common examples are referred to as Generative Pre-trained Transformers (GPTs). These models are "large" in the scope of their training data and the complexity of the tasks they can perform. LLMs are developed through a technique known as deep learning, where the model is exposed to vast amounts of training data. This exposure enables the model to learn patterns, nuances, and the structure of language over time.

At their core, LLMs are built upon neural networks, specifically a variant called transformers, which are adept at handling sequential data like text. The training process involves feeding the neural network examples of text, allowing it to adjust its internal parameters to reduce errors in prediction tasks, such as next-word prediction. Over time, and with enough data and computational power, these models become highly proficient at generating coherent, contextually relevant text based on the instructions or prompts that they receive.

LLMs have a wide range of applications, including but not limited to content generation, summarization, question-answering, and conversational agents. They can understand queries, provide answers, and even generate content that mimics human-like prose. Their ability to process and generate language has made them invaluable tools in enhancing human-computer interaction, automating content creation, aiding in educational tools, and much more.

The LLMs 140, as shown in FIG. 1C, are not, however, the commonly known GPTs or the like that are trained on a vast corpus of natural language documents. Rather, the LLMs 140 are trained on computer code as their training data. Vast amounts of code or code changes with corresponding explanations of what the code or code change is doing constitute the training set of an LLM 140. Each LLM 140 shown in FIG. 1C corresponds to, and is trained on, a different programming language. Such LLMs 140 can be used to generate code based on a description of what the code is supposed to do.

Consequently, the code summarization module 133 will submit the information about a build or a number of builds to an LLM 140 that corresponds to the programming language of the builds. The code summarization module 133 also includes in the prompt to the LLM 140 an instruction to return a summarization of what the build or builds are doing with respect to the application or service in which they are being deployed. Based on their training, the LLMs 140 are then able to return the summary, described above, that explains to an administrator what the build or builds are intended to do in the context of the application or service in which they are deployed. As described above in connection with FIG. 1C, this summary can become a part of the prompt to the AI 128 by the recommendation module 124 (FIG. 1A).

Figure 1D:
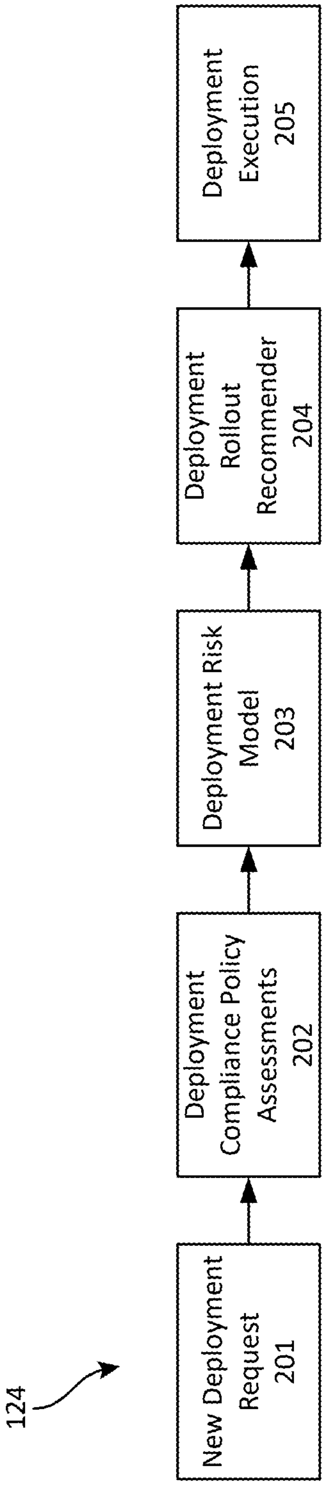
FIG. 1D depicts additional details of the AI Recommendation Module of FIGS. 1A and 1B.

FIG. 1D depicts details of the AI recommendation module according to an example of the subject matter described herein. As shown in FIG. 1D, the AI recommendation module 124 has an interface to receive a new deployment request 201 when a software change is to be deployed. Receipt of a deployment request triggers deployment compliance policy assessments 202. A deployment risk model 203 and deployment rollout recommender 204 then produce a recommended deployment policy, as will be described further below. Then, deployment execution 205 is conducted using the recommended deployment policy.

Figure 2:
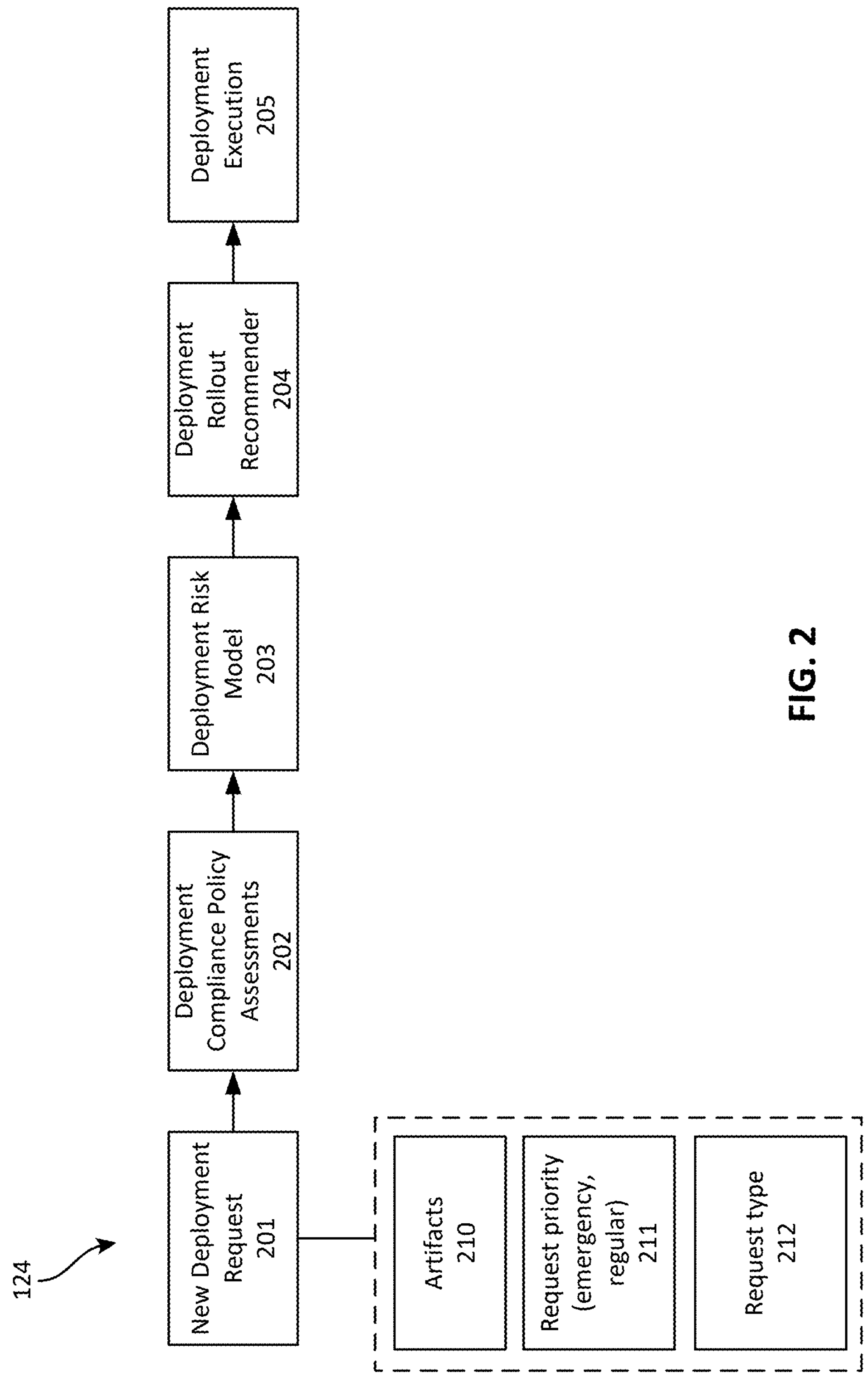
FIGS. 2-5 depict further details of the components and operations of the AI Recommendation Module of FIG. 1D according to an example of the subject matter described herein.

FIG. 2-5 depict additional details of the AI recommendation module of FIG. 1D according to an example of the subject matter described herein. As shown in FIG. 2, the module 124 (FIG. 1D) first receives a new deployment request 201. With each new deployment request 201, the following information may be received: (1) an identification of the build artifacts 210 in the build data store 123 to be deployed; (2) a request priority 211, e.g., is the request a regular or expedited/emergency request; (3) a request type 212, e.g., is the software change to be implemented a standard upgrade rollout, a rollback, a roll forward or hotfix.

As noted above, for each deployment request, the system will assess request compliance with any applicable policies regarding deployments generally. Deployment compliance policy assessments in a software update release pipeline are important to ensuring that software changes meet predefined standards and criteria before they are released. These assessments help in maintaining quality, security, and reliability throughout the deployment process. Each type of compliance assessment plays a specific role in this process. Thus, a rules engine conducts deployment compliance policy assessments 202 including ensuring that data is available for the compliance checks.

Figure 3:
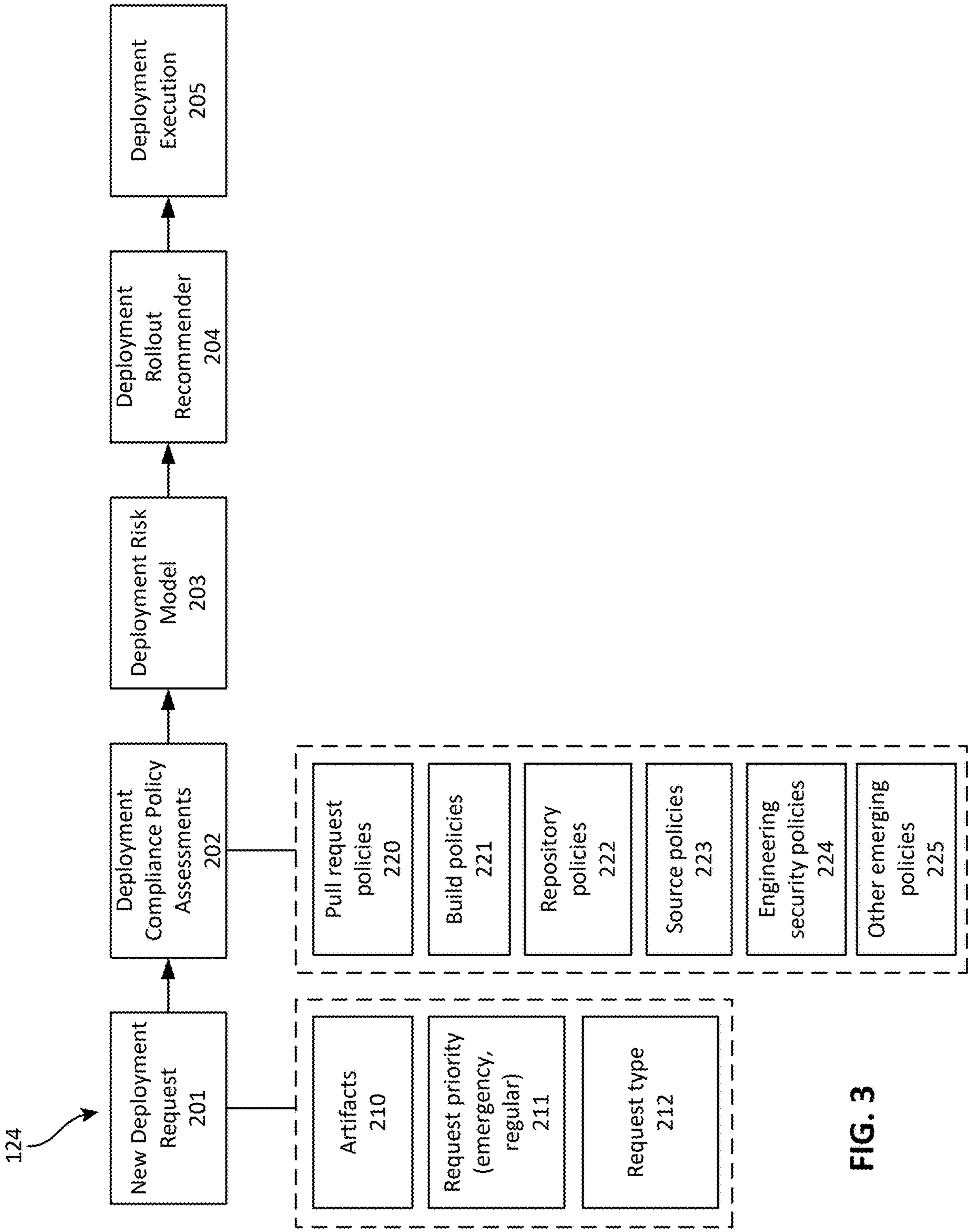

With reference to FIG. 3, pull request policies 220 allow for compliance assessments to ensure that changes introduced via pull requests adhere to the organization's standards and best practices before they are merged into the main codebase. Examples of this type of compliance include mandatory code reviews, ensuring that pull requests are reviewed and approved by at least one other developer. Linting and style checks verify that the code follows prescribed coding standards and style guidelines. Additionally, testing ensures that new changes are accompanied by appropriate unit and integration tests, and that these tests pass. Dependency checks validate that any new dependencies are approved and do not introduce security vulnerabilities.

Build policies 221 for build compliance assessments ensure that the build process adheres to required standards and that the software builds correctly and consistently. This includes ensuring build success, where the code compiles and builds successfully without errors. Build reproducibility is verified to ensure that the build can be reproduced with the same results, ensuring consistency across environments. Artifact integrity checks confirm that the produced artifacts, such as binaries and containers, are correctly versioned and stored in a secure repository.

Repository policies 222 for compliance assessments ensure that the repository configuration and contents adhere to organizational policies. Examples include enforcing branch protection rules, which may require pull requests for changes to the main branch and prevent force-pushes. Access controls ensure that only authorized users have access to the repository, with appropriate permissions. License compliance involves verifying that the repository contains the correct licensing information and that dependencies comply with open-source licenses.

Source policies 223 for compliance assessments focus on the source code itself, ensuring that it meets certain standards and does not contain prohibited content. Static code analysis tools analyze the source code for potential vulnerabilities, code smells, and other quality issues. Sensitive data detection ensures that the source code does not contain hard-coded secrets, credentials, or other sensitive information. Adequate code commenting and documentation are verified to ensure that the code is sufficiently commented and documented for understanding and maintenance.

Engineering security policies 224 for compliance assessments ensure that security practices are integrated into the software development lifecycle. Vulnerability scanning involves scanning the code and dependencies for known vulnerabilities and ensuring they are addressed. Secure coding practices ensure that developers follow guidelines to prevent common vulnerabilities like SQL injection and cross-site scripting (XSS). Security testing includes security-specific tests such as penetration testing or fuzz testing in the continuous integration/continuous deployment (CI/CD) pipeline.

Other emerging policies 225 encompass a range of new and evolving compliance requirements that might be specific to certain industries, technologies, or organizational needs. Regulatory compliance ensures that the software adheres to relevant regulatory requirements, such as the General Data Protection Regulation (GDPR) for data protection or the Health Insurance Portability and Accountability Act (HIPAA) for healthcare data. Environmental impact assessments consider the environmental impact of the deployment, such as energy consumption and carbon footprint. Ethical considerations for AI ensure that AI and machine learning models used in the software are trained and deployed ethically, avoiding biases and ensuring transparency.

These compliance assessments are integrated into the release pipeline using automated tools and manual checks at various stages. At the pull request stage, automated tools and manual reviews assess pull request compliance. During the build stage, build compliance is checked using CI tools that ensure the build succeeds and meets quality standards. Repository policies are enforced through repository settings and access controls. Automated static code analysis tools run to ensure source compliance, and security tools scan the code and dependencies for vulnerabilities as part of engineering security compliance. Specialized tools or manual audits ensure compliance with emerging policies, such as regulatory requirements. By implementing these compliance assessments, organizations can maintain high standards of quality, security, and reliability in their software deployment processes.

Figure 4:
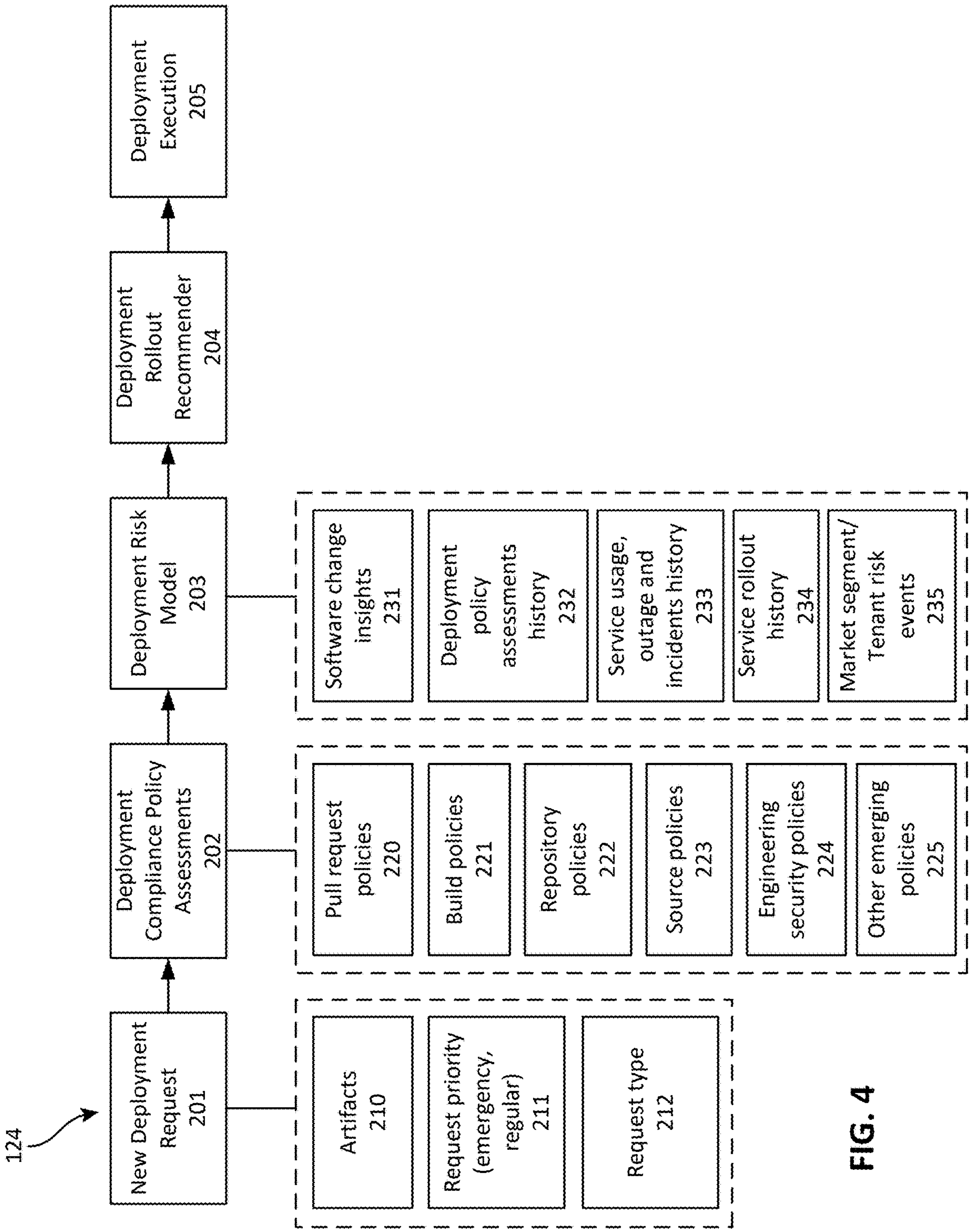

As shown in FIG. 4, the deployment risk model 203 assembles information that the AI will take into account to generate a recommended deployment policy. This information includes an identification of the sources of risk for the service by collecting historical data from service outages, incidents, rollouts, user risk events. Specifically, the deployment risk model 203 assembles the following information:

(1) software change insights 231, e.g., the type of change associated with the deployment request, a category of change such as minor, major, etc. This information may come from the software change insights module 103 as described above.

(2) deployment policy history 232, e.g., historical policy assessments for security policies and any known security risks.

(3) service usage, outage and incidents 233, e.g., historical data of peak service usage, service outages and reasons, service incidents and reasons.

(4) service rollouts 234, e.g., historical data for service rollouts including bake time, ring policies and time of deployments, and historical data of any rollouts causing incidents and outages.

(5) market segment/tenant risk events 235, e.g., tenant usage patterns for services, this could be industry specific, geographic specific and tenant specific risk events.

This information can come from the deployment data store and is provided to the recommendation module 124 via the unified data platform 102 and the software change insights module 103.

For example, for tenants who work in the financial sector, year-end may be a critical time during which an interruption in a cloud service can have very significant costs. This is a tenant risk event specific to this and perhaps other tenant groups. Accordingly, by taking this into account in determining an optimal deployment policy, deployment for these tenants may be scheduled away from the critical year-end period of time so as to avoid the risk of any unforeseen issue causing outsized losses simply because of the time of year the software change is implemented. Similarly, airlines may experience a peak volume of customers at year-end or other peak travel seasons. Deployment of software changes to these tenants may also need to be scheduled, to the extent possible, away from these period of specific tenant risk.

Peak service usage is another factor. For example, tenants that are based in a particular geographic region will have peak usage of a service during business hours in that region. Consequently, software change deployment to tenants should optimally be scheduled outside of the peak service usage for the geography of different tenant groups.

Software changes also present different levels of risk. A change that is small to an existing feature may have less associated risk than a change that is more significant, e.g., adds an entirely new feature to the service. As noted above, different tenants may have different risk tolerances at different times of day or seasons of the year. Accordingly, considering both the type of change being made, its risk level and the risk tolerance of different tenants facilitates the optimization of an overall deployment policy.

Software rollouts history can also be taken into account. For example, if a similar software change to the current change been rolled out previously, the historical telemetry from that rollout can be taken into account as predictive of how the current change might rollout and adversely impact tenants. Accordingly, information from previous software rollouts can be considered by the AI in optimizing a current deployment policy. This can include considering previous outages and incidents in the cloud service that have similarities or relevance to the current software change to be deployed. Lastly, the compliance assessment history of the build to be deployed can be considered by the AI in optimizing a current deployment policy.

Using all this information, the deployment risk model 203 can score the risk of the software change as "not rated," "low risk," "medium risk," or "high risk" using a collection of risk models. Based on the risk assessment, the system moves to the next step of recommending the optimal deployment policy.

Figure 5:
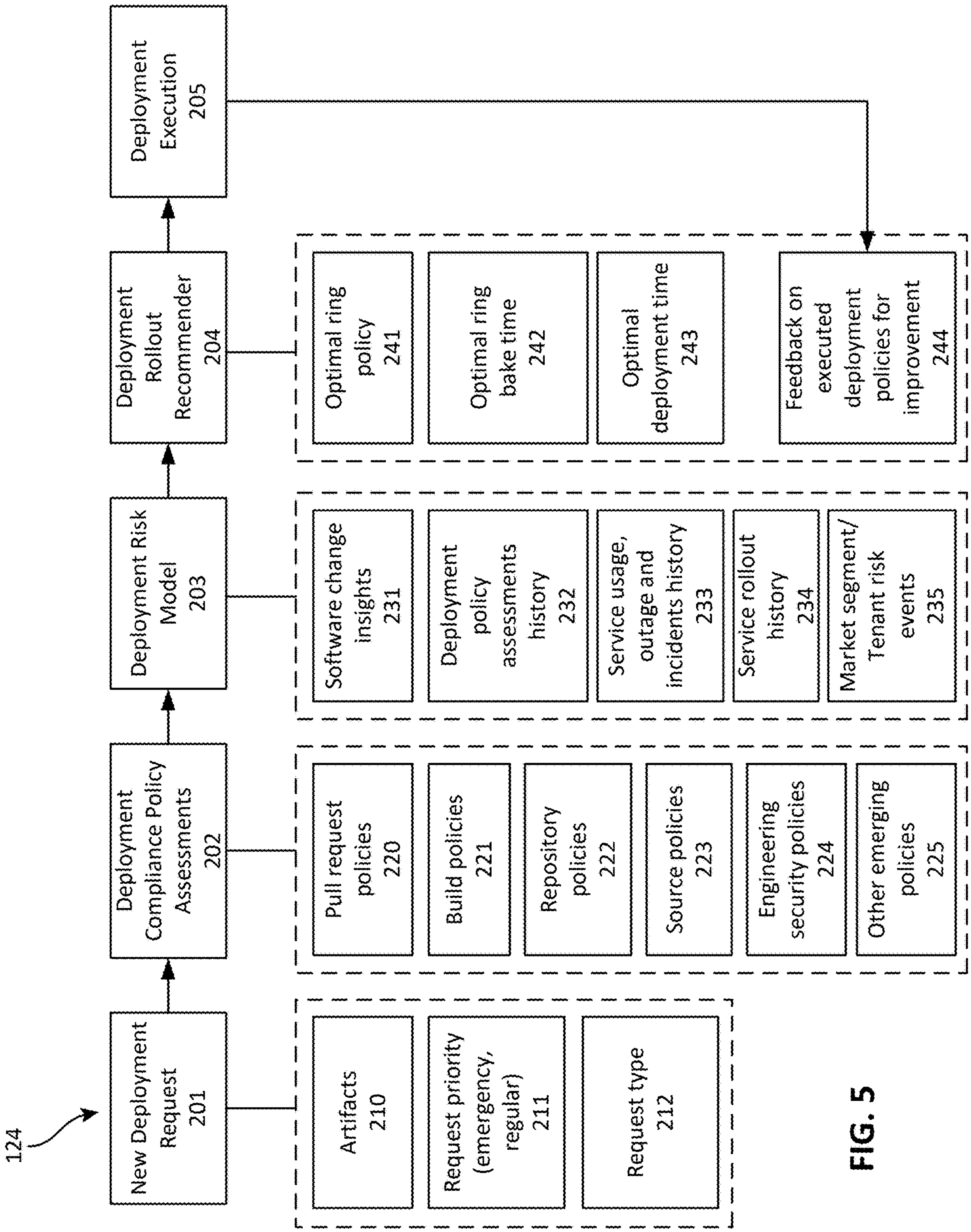

As shown in FIG. 5, the information assembled by the deployment risk model 203 is used in a prompt to the AI that is processed by the deployment rollout recommender 204. The prompt instructs the AI to, based on its training dataset, recommend a deployment policy for the deployment request that includes an optimal ring policy 241, optimal ring bake time 242 and optimal deployment time 243. As noted, this deployment policy is based, at least in part, on the specific needs and risks of the tenant groups in the userbase. Accordingly, the rollout of the software change of the deployment request 201 is less likely to cause significant issues or lost productivity for the various different tenant groups in the userbase.

This optimized deployment policy is, as described above, provided to the deployment engine (127, FIG. 1B) which conducts the deployment execution 205 accordingly. As also described above, telemetry from this deployment is provided as feedback 244 to the deployment rollout recommender 204. Specifically, as the system executed software change deployments, the system can monitor the drift between recommended and actual deployment execution data to identify new risk sources, user events, incidents to optimize the recommendations further. This feedback 244 can then be used to enhance or update the training of the AI (124, FIG. 1B). For example, this feedback 244 augments the training dataset on which the AI is trained and operates.

Figure 6:
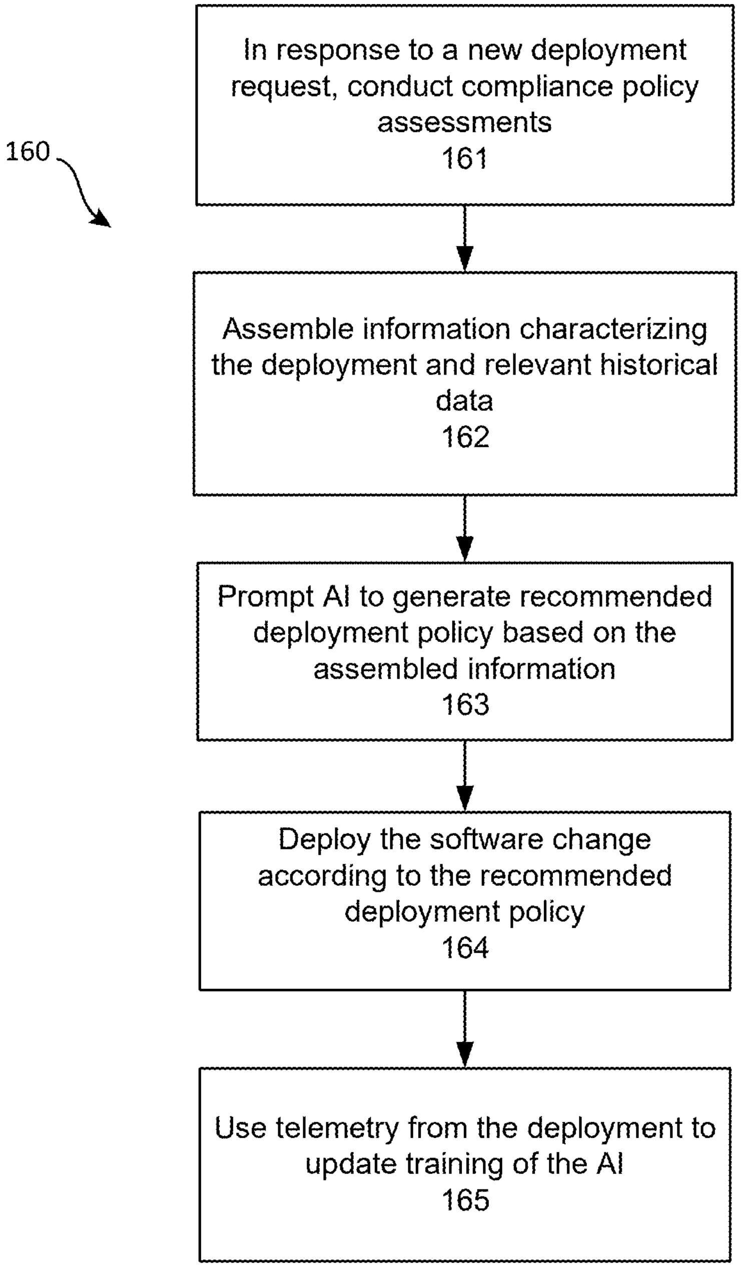
FIG. 6 is a flowchart illustrating the AI-driven deployment policy technique described herein.

FIG. 6 is a flowchart illustrating the AI-driven deployment policy technique described herein. As shown in FIG. 6, the method 160 includes responding to a new deployment request by conducting compliance policy assessments 161. After this, information is assembled that characterizes the deployment and relevant historical data 162, as described above. Then, a trained AI is prompted to recommend a customized deployment policy based on the assembled information 163. The software change is then deployed according to the recommended deployment policy 164. Then, telemetry from the deployment is used to update the training for the AI and improve future deployment policy recommendations 165.

In summary, the system uses AI powered personalized recommendations to intelligently select deployment policies and strategies to route deployments across various tenant environments. This will help balance the risk of rolling out tenant improvements quickly with compromising on the reliability of services and will help ensure the tenants have better service experiences.

As described above, the system presented provides a deployment risk model which uses historical data from service outages, incidents, rollouts, user risk events to come up with a holistic risk assessment framework for a software change. The system can score the risk of the software change using a collection of models to ensure the risk is accurately determined and new risk features are actively learned from each release and used for the next release. The system provides three key recommendations: optimal rollout policy, optimal bake time and deployment time for deployment, considering user specific requirements, risks and usage patterns. The system learns based on the recommendation vs. actual behavior drift and intelligently optimizes the policies for the services for subsequent rings and deployments. Lastly, the system provides personalized service specific, ring specific, and tenant specific recommendations to ensure the user experience, service reliability and availability are not compromised. The system is both data driven and extensible.

Figure 7:
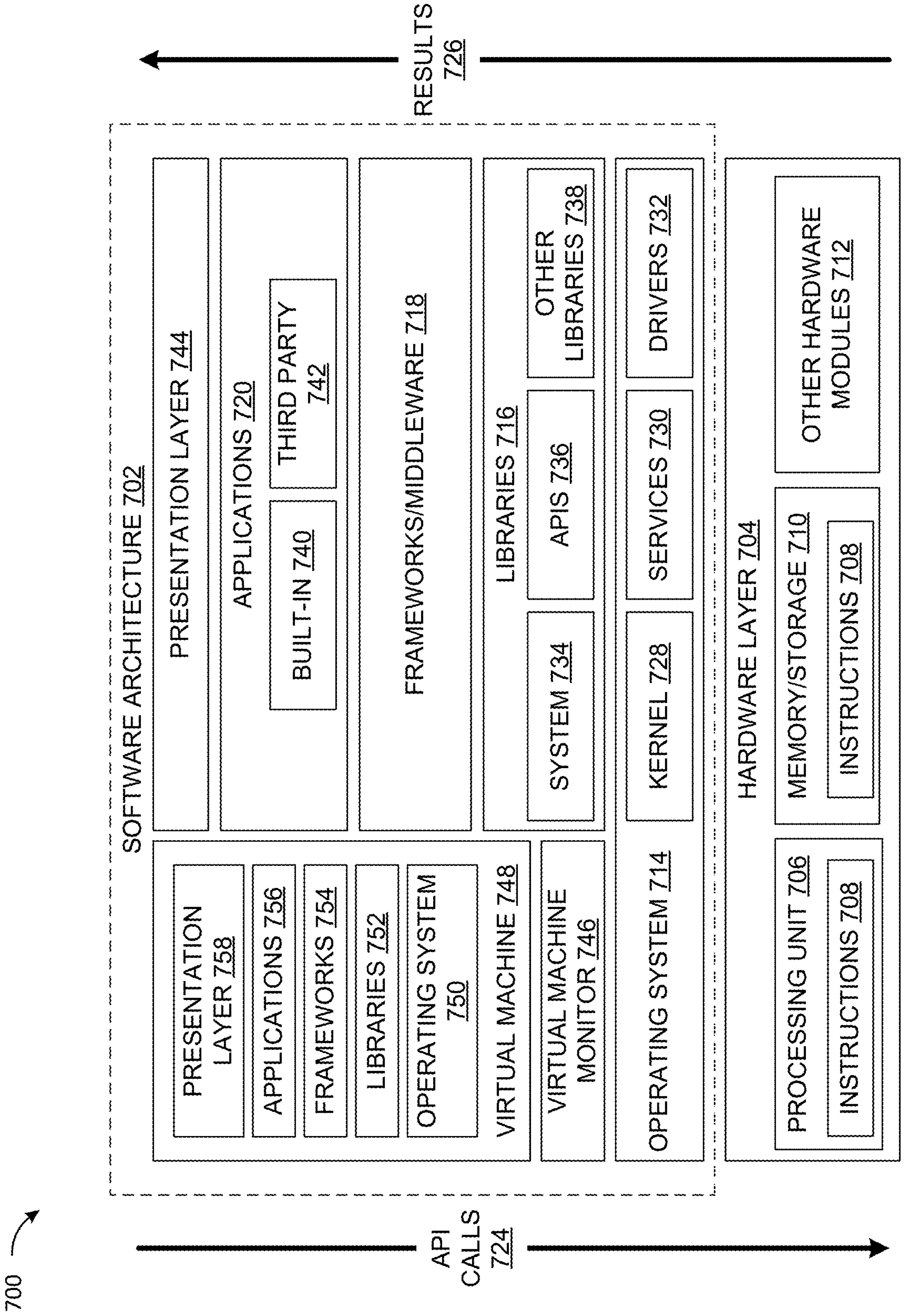
FIG. 7 is a block diagram illustrating an example software architecture, various portions of which may be used in conjunction with various hardware architectures herein described.

FIG. 7 is a block diagram 700 illustrating an example software architecture 702 that can be used to embody the recommendation module 124 described above. Various portions of the architecture may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
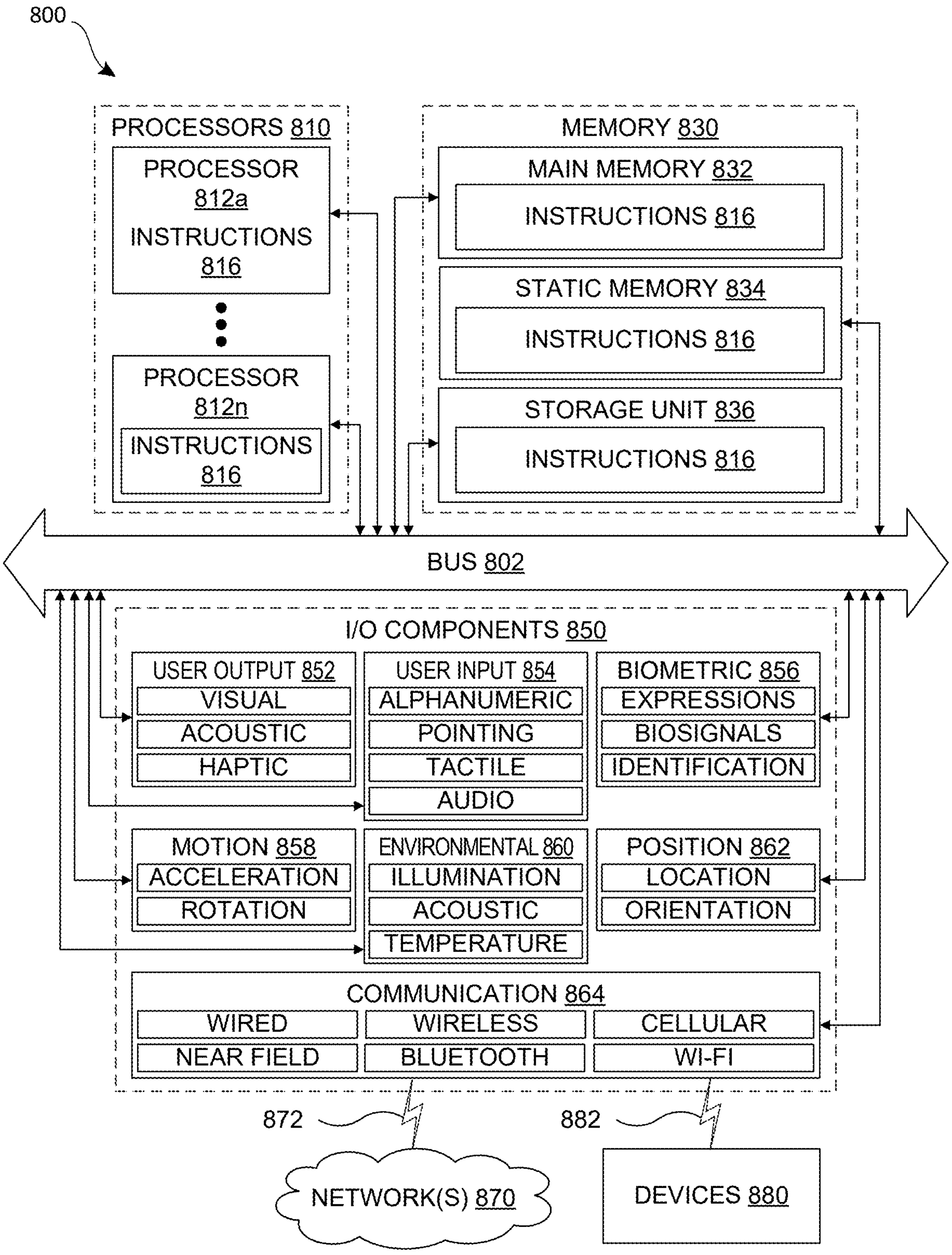
FIG. 8 is a block diagram illustrating components of an example machine configured to read instructions from a machine-readable medium and perform any of the features described herein.

FIG. 8 is a block diagram illustrating components of an example machine 800 configured to implement a software architecture, such as that of FIG. 7. The machine 800 is configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor alone or in combination with other processors, cause the data processing system to perform functions of:
receive a deployment request to deploy a software change;
determine factors corresponding to the deployment request that impact an optimal deployment policy for the software change;
query an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time;
execute the deployment request using the optimized deployment policy returned by the AI; and
update training of the AI based on the determined factors and results of the optimized deployment policy.

2. The system of claim 1, wherein the factors include software change type, service rollout history and tenant risk events based on tenant location and sector.

3. The system of claim 1, further comprising a function of conducting deployment compliance policy assessments for the deployment request, a result of the assessments being input to the AI for consideration in generating the optimized deployment policy.

4. The system of claim 3, wherein the deployment compliance policy assessments are performed by a rule engine and include pull request policies, build policies, repository policies, source policies and engineering security policies.

5. The system of claim 1, further comprising a deployment risk model to determine the factors corresponding to the deployment request that impact an optimal deployment policy for the software change.

6. The system of claim 5, wherein the deployment risk model is to communicate with a software change insights module to determine some of the factors, the software change insights module using a number of code-trained Large Language Models to summarize and categorize the software change of the deployment request.

7. The system of claim 5, wherein the deployment risk model is to retrieve a deployment compliance policy assessments history to determine some of the factors.

8. The system of claim 5, wherein the deployment risk model is to retrieve usage, outage and incidents history for the service to be updated by the software change so as to determine some of the factors based on the usage, outage and incidents history.

9. The system of claim 5, wherein the deployment risk model is to retrieve a rollout history for the service to be updated by the software change so as to determine some of the factors based on the rollout history.

10. The system of claim 5, wherein the deployment risk model is to retrieve information specific to different tenant groups that use a service to be updated by the software change and to determine some of the factors based on the information specific to the different tenant groups.

11. The system of claim 10, wherein the information specific to different tenant groups includes tenant usage of the service based on geography, time of day or time of year.

12. A data processing system comprising a processor and a memory in communication with the processor, the memory comprising executable instructions that, when executed by the processor alone or in combination with other processors, cause the data processing system to implement:
a software release pipeline to receive a deployment request to deploy a software change;
a deployment risk model to determine factors corresponding to the deployment request that impact an optimal deployment policy for the software change;
a deployment rollout recommender to query an Artificial Intelligence (AI) trained with a dataset of optimized deployment policies based on corresponding sets of the factors, the query requesting an optimized deployment policy for the software change of the received deployment request based on the determined factors and including a ring rollout policy, ring bake time and deployment time; and
a deployment engine to execute the deployment request using the optimized deployment policy returned by the AI.

13. The system of claim 12, wherein the deployment engine is further configured to update training of the AI based on the determined factors and results of the optimized deployment policy.

14. The system of claim 12, wherein the factors include software change type, service rollout history and tenant risk events based on tenant location and sector.

15. The system of claim 12, further comprising a rules engine to assess compliance with deployment policies for the deployment request,
a result of the assessment being input to the AI for consideration in generating the optimized deployment policy, and
the assessment comprising pull request policies, build policies, repository policies, source policies and engineering security policies.

16. The system of claim 12, wherein the deployment risk model is to communicate with a software change insights module to determine some of the factors, the software change insights module using a number of code-trained Large Language Models to summarize and categorize the software change of the deployment request.

17. The system of claim 16, wherein the deployment risk model is to retrieve usage, outage and incidents history for the service to be updated by the software change so as to determine some of the factors based on the usage, outage and incidents history.

18. The system of claim 17, wherein the deployment risk model is to retrieve a rollout history for the service to be updated by the software change so as to determine some of the factors based on the rollout history.

19. The system of claim 18, wherein the deployment risk model is to information specific to different tenant groups using a service to be updated by the software change and to determine some of the factors based on the information specific to the different tenant groups.

20. A method of determining an optimal deployment policy for a software change to a cloud service, the method comprising:
receiving a deployment request to deploy a software change;

determining factors corresponding to the deployment request that impact an optimal deployment policy for the software change;

prompting an Artificial Intelligence (AI) trained with a dataset of optimized deployment policies based on corresponding sets of the factors, the prompt requesting an optimized deployment policy for the software change of the received deployment request based on the determined factors and including a ring rollout policy, ring bake time and deployment time;

executing the deployment request using the optimized deployment policy returned by the AI; and updating training of the AI based on the determined factors and results of the optimized deployment policy.

* * * * *